United States Patent
Tang et al.

(10) Patent No.: US 11,508,241 B2
(45) Date of Patent: Nov. 22, 2022

(54) PARKING AREA MAPPING USING IMAGE-STREAM DERIVED VEHICLE DESCRIPTION AND SPACE INFORMATION

(71) Applicant: Capital One Services, LLC, McLean, VA (US)

(72) Inventors: Qiaochu Tang, McLean, VA (US); Micah Price, McLean, VA (US); Jason Hoover, McLean, VA (US); Avid Ghamsari, McLean, VA (US); Geoffrey Dagley, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 281 days.

(21) Appl. No.: 16/862,416

(22) Filed: Apr. 29, 2020

(65) Prior Publication Data

US 2021/0343146 A1 Nov. 4, 2021

(51) Int. Cl.
*G08G 1/14* (2006.01)
*G01C 21/32* (2006.01)
*G01C 21/36* (2006.01)
*G05D 1/02* (2020.01)

(52) U.S. Cl.
CPC ............ *G08G 1/143* (2013.01); *G01C 21/32* (2013.01); *G01C 21/3664* (2013.01); *G01C 21/3673* (2013.01); *G01C 21/3676* (2013.01); *G01C 21/3685* (2013.01); *G05D 1/0276* (2013.01)

(58) Field of Classification Search
None
See application file for complete search history.

(56) References Cited

U.S. PATENT DOCUMENTS

| | | | |
|---|---|---|---|
| 2016/0267794 A1* | 9/2016 | Cogill | G08G 1/144 |
| 2016/0371551 A1* | 12/2016 | Atsmon | G01C 21/362 |
| 2020/0035101 A1* | 1/2020 | Brooks | G08G 1/143 |

OTHER PUBLICATIONS

M Tschentscher, M Neuhausen, "Video-based parking space detection", 2012, Proceedings of the Forum Bauinformatik (Year: 2012).*

* cited by examiner

*Primary Examiner* — Yuen Wong
*Assistant Examiner* — Hongye Liang
(74) *Attorney, Agent, or Firm* — Perkins Coie LLP

(57) ABSTRACT

In certain embodiments, a vehicle may obtain a video stream via a camera system of the vehicle. The video stream may be processed to extract one or more feature vectors from the video stream. Based on the feature vectors extracted from the video stream, vehicle description information related to one or more parked vehicles in the parking area may be determined. Space information indicating locations of the parked vehicles relative to available parking spaces in the parking area may also be determined based on the feature vectors extracted from the video stream. A mapping of the parking area may then be generated based on the vehicle description information and the space information.

20 Claims, 6 Drawing Sheets

US 11,508,241 B2

PARKING AREA MAPPING USING IMAGE-STREAM DERIVED VEHICLE DESCRIPTION AND SPACE INFORMATION

FIELD OF THE INVENTION

The invention relates to parking area mapping, including, for example, obtaining a video stream from a vehicle camera system and determining video-stream-derived vehicle description and parked vehicle locations to generate a mapping of a parking area.

BACKGROUND OF THE INVENTION

Finding parking can be a tedious process that can lead to high levels of frustration for individuals struggling to find a single parking spot among a sea of filled spaces. Traditional solutions can help but are often expensive to implement and won't provide a personalized experience catered to the user's unique needs.

Current solutions for identifying parking spot availability center around modifying the parking lot itself. These solutions are most commonly found at airports and other large parking structures where finding parking can be a hassle especially during times of near full occupancy. Most of these solutions use simple sensors/cameras that hang over or sit in front of a parking spot and can detect the presence of an object in that spot. This requires modification of the existing parking structure and can be costly to install and maintain.

SUMMARY OF THE INVENTION

Aspects of the invention relate to methods, apparatuses, and/or systems for generating a mapping of a parking area. For example, a video stream may be obtained by a vehicle camera system. Vehicle description information of parked vehicles and space information indicating locations of the parked vehicles relative to parking spaces may be determined based on the obtained video stream. Using the vehicle description information and the space information, a mapping of the parking area may be generated.

In some embodiments, a vehicle may obtain a video stream via a camera system of the vehicle. The video stream may be processed to extract one or more feature vectors from the video stream. Based on the feature vectors extracted from the video stream, vehicle description information related to one or more parked vehicles in the parking area may be determined. Space information indicating locations of the parked vehicles relative to available parking spaces in the parking area may also be determined based on the feature vectors extracted from the video stream. A mapping of the parking area may then be generated based on the vehicle description information and the space information.

In some embodiments, candidate vehicle description information may be obtained via wireless connections between the vehicle and one or more other parked vehicles. After the candidate vehicle description information is obtained, the candidate vehicle description information may be verified by the vehicle description information obtained by the camera system. In some embodiments, the candidate vehicle description information may indicate the color of the parked vehicles, the vehicle type of the parked vehicles, the vehicle identification number (VIN) of the parked vehicles, the license plate number of the parked vehicles, or other information. In some embodiments, the mapping of the parking area may indicate (i) the color and vehicle type of each of the parked vehicles, (ii) the locations of the parked vehicles relative to the available parking spaces, or (iii) other information.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
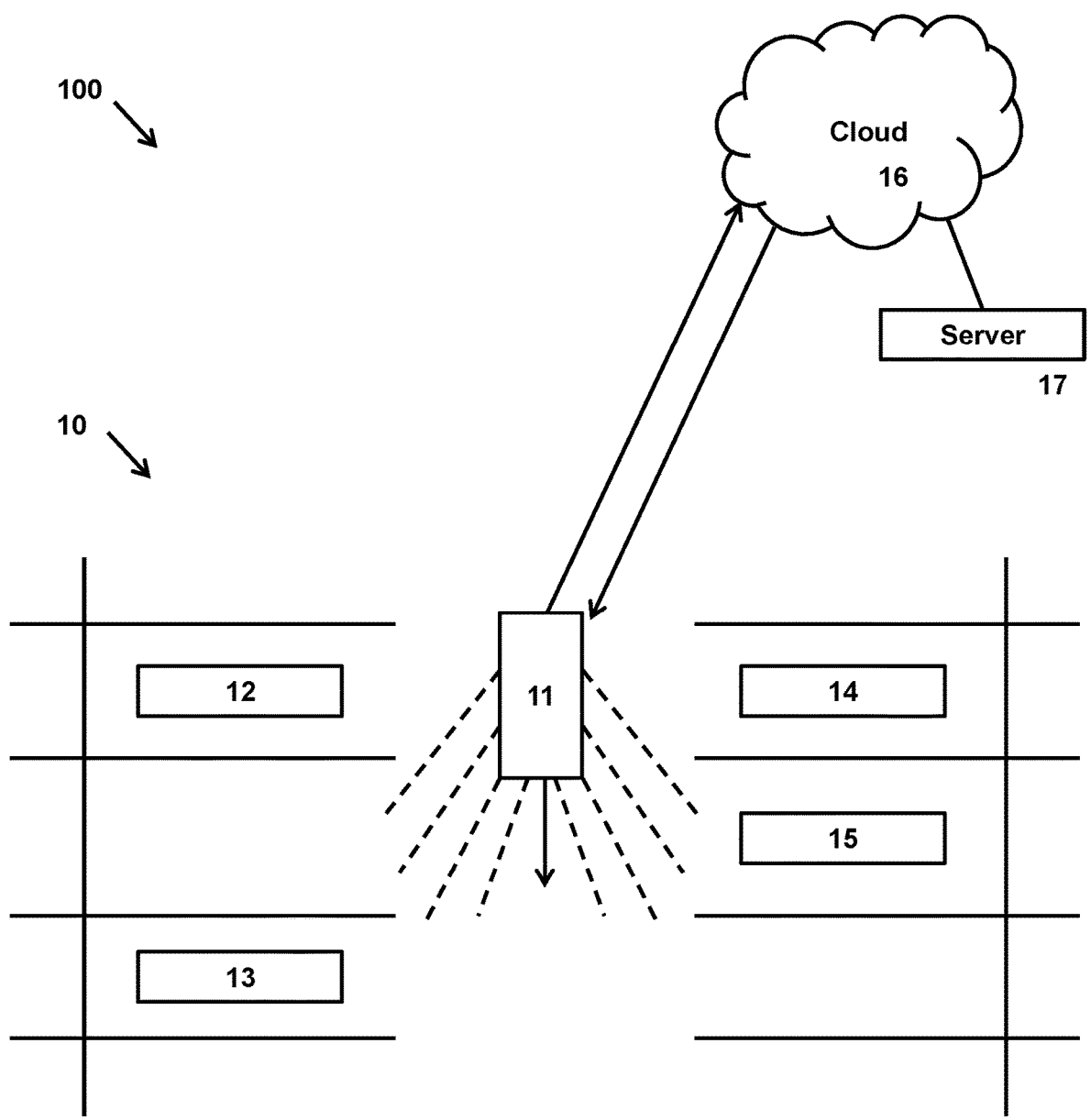
FIG. 1A shows a system for generating a mapping of a parking area, in accordance with one or more embodiments.

FIG. 1A shows a system 100 for generating a mapping of a parking area, in accordance with one or more embodiments. System 100 includes parking area 10, vehicle 11, parked vehicles 12-15, cloud 16, and server 17. In some embodiments, vehicle 11 communicates with cloud 16 and server 17 over a wireless network. In some embodiments, vehicle 11 obtains an image stream (which may include a video stream) via a camera system as vehicle 11 moves past parked vehicles (e.g., parked vehicles 12-15). FIG. 1A illustrates image capture with dotted lines. Image capture is described in more detail below. It should be noted that the number and locations of the vehicles shown in FIG. 1A are illustrative and are not intended to be limiting.

Figure 1B:
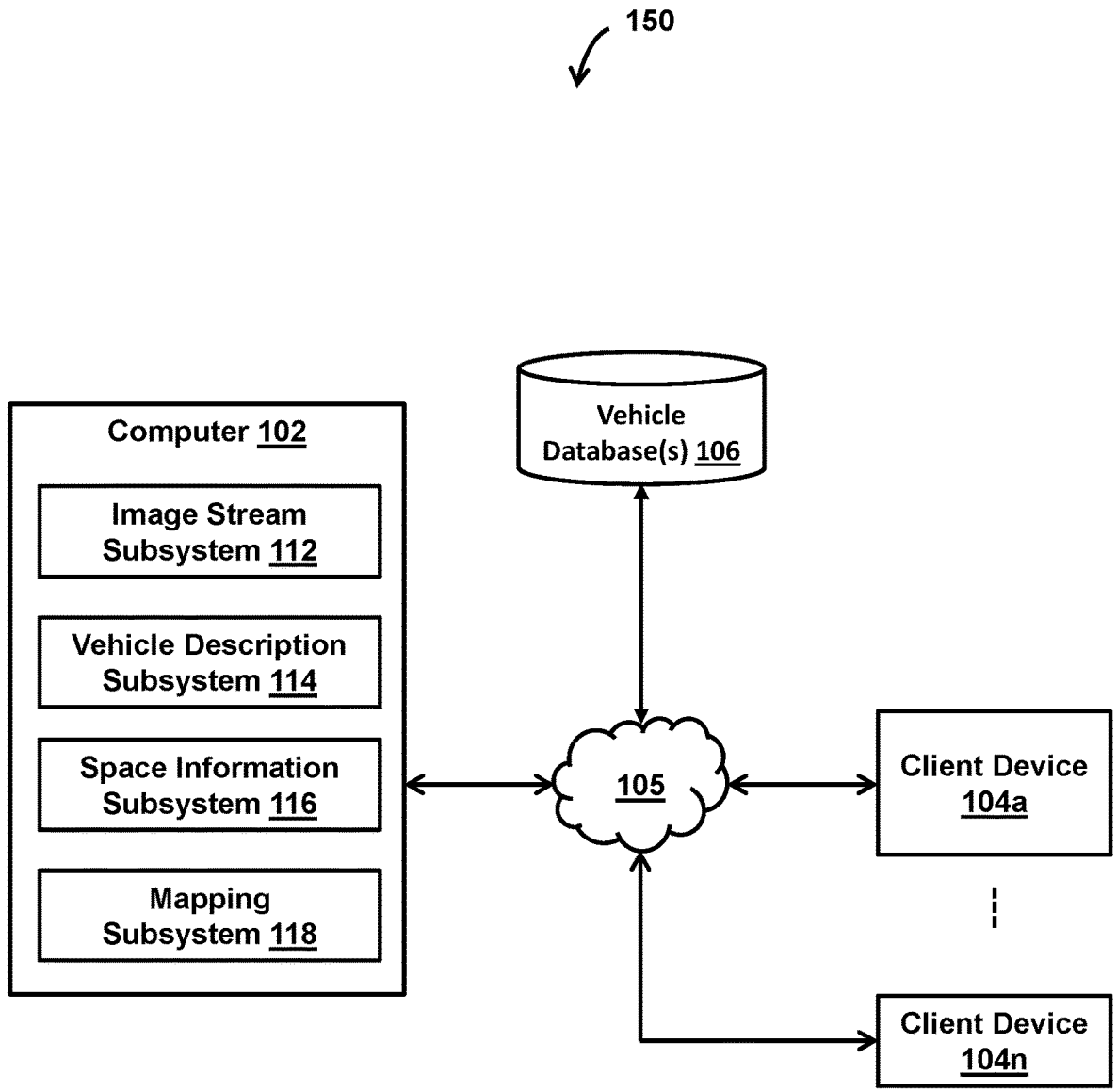
FIG. 1B shows a system for generating a mapping of a parking area, in accordance with one or more embodiments.

In some embodiments, system 100, as shown in FIG. 1A, may be facilitated by system 150, as shown in FIG. 1B. FIG. 1B shows system 150 for generating a mapping of a parking area, in accordance with one or more embodiments. As shown in FIG. 1B, system 150 may include computer 102, client device 104 (or client devices 104a-104n), vehicle database(s) 106, or other components. Computer 102 may include image stream subsystem 112, vehicle description subsystem 114, space information subsystem 116, mapping subsystem 118, or other components. Each client device 104 may include any type of mobile terminal, fixed terminal, or other device. By way of example, client device 104 may include a vehicle, a notebook computer, a tablet computer, a smartphone, a wearable device, or other client device. Users may, for instance, utilize one or more client devices 104 to interact with one another, one or more servers, or other components of system 150. It should be noted that, while one or more operations are described herein as being performed by particular components of computer 102, those operations may, in some embodiments, be performed by other components of computer 102 or other components of system 150. As an example, while one or more operations are described herein as being performed by components of computer 102, those operations may, in some embodiments, be performed by components of client device 104.

Various components of system 150 may be connected via network 105. Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, Zig-Bee™ ambient backscatter communication (ABC) protocols, USB, WAN, or LAN.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components of system 150 to send and receive information between other components of system 150. In some embodiments, network 105 may provide a connection between vehicle 11, cloud 16, and server 17, as shown in FIG. 1A.

In some embodiments, system 150 may generate a mapping of a parking area based on information derived from an image stream. In some embodiments, the image stream may be obtained by a camera system (e.g., a vehicle camera system). In some embodiments, information derived from the image stream may relate to vehicle description information of parked vehicles in the parking area, as determined by vehicle description subsystem 114. Such vehicle description information may include one or more colors, vehicle types, vehicle identification numbers (VIN), license plate numbers, or other information of the parked vehicles. In some embodiments, vehicle description subsystem 114 may obtain vehicle description information about the other parked vehicles from a database (e.g., vehicle database(s) 106). In some embodiments, based on the image stream, system 150 may obtain space information related to available parking spaces in the parking area (e.g., via space information subsystem 116). In some embodiments, the space information may indicate the locations of available parking spaces in the parking area relative to parked vehicles in the parking area. In some embodiments, using the vehicle description and space information derived from the image stream, system 150 (e.g., using mapping subsystem 118) may generate a mapping of the parking area indicating relative locations of the parked vehicles and the available parking spaces.

In some embodiments, image stream subsystem 112 may receive an image stream (e.g., video stream) from a client device 104 (e.g., vehicle 11). For example, computer 102, as shown in FIG. 1B, may correspond to server 17, as shown in FIG. 1A. In some embodiments, image stream subsystem 112 may receive the image stream when vehicle 11 enters parking area 10. In some embodiments, the image stream may be captured by a vehicle camera system (e.g., a camera for parking assistance) of vehicle 11. For example, the image stream may show a portion of parking area 10. In some embodiments, the image stream may show parked vehicles (e.g., vehicles 12-15) in parking area 10 as well as available spaces in parking area 10. As shown in FIG. 1A, parked vehicles 12-15 may be located in specific locations relative to each other and relative to the available spaces in parking area 10. The image stream may capture any objects or spaces in the vicinity of vehicle 11. In some embodiments, image stream subsystem 112 may receive a raw image stream, a raw video stream, processed images, processed videos, or other image data from vehicle 11.

In some embodiments, vehicle description information is determined by vehicle description subsystem 114 based on the image stream obtained by image stream subsystem 112. After the image stream is obtained, system 150 may process the image stream and extract feature vectors. A feature vector may comprise information related to specific structures or variables in the image stream, such as points, edges, or objects. In some embodiments, feature vectors may comprise numerical representations of structures or variables in the image stream. Feature extraction may include methods of constructing combinations of variables from the image stream in a large set of data. In some embodiments, image processing methods may be used to detect and classify features identified in the image stream. Various methods including pattern recognition, object recognition, color analysis, and other image processing techniques may be used to analyze one or more feature vectors or a set of feature vectors. In some embodiments, image processing techniques may be used to identify patterns, objects (e.g., vehicles), space information (e.g., available spaces), or other structures of the image stream. Using the extracted feature vectors, vehicle description subsystem 114 may identify parked vehicles and determine vehicle description information including, for example, color, vehicle type, VIN, and license plate number of the parked vehicles. For example, image stream subsystem 112 may obtain an image stream of parking area 10 in which several vehicles (e.g., parked vehicles 12-15) are parked. Vehicle description subsystem 114 may process the image stream obtained by image stream subsystem 112 and determine that parked vehicle 12 is a red 2012 Ford Mustang GT, license plate BRI 1247. In some embodiments, vehicle description subsystem 114 may repeat these steps for each vehicle captured by the image stream or for each vehicle in parking area 10. In some embodiments, vehicle description subsystem 114 may determine vehicle description information for parked vehicles next to vehicle 11 (e.g., parked vehicle 12 and parked vehicle 14) in order to determine a location of vehicle 11 within parking area 10. Methods of obtaining vehicle description information are described in more detail below with respect to particular embodiments of the present invention.

In some embodiments, vehicle description subsystem 114 may receive vehicle description information (or candidate vehicle description information) via one or more wireless connections between vehicle 11 and one or more other vehicles (e.g., parked vehicles 12-15), and such vehicle description information may be used to generate a mapping of parking area 10. In some embodiments, vehicle description subsystem 114 may wirelessly receive the vehicle description information from one or more parked vehicles 12-15. In some embodiments, the candidate vehicle description information may indicate a color, vehicle type, vehicle identification number (VIN), license plate number, or other information of each respective parked vehicle. In some embodiments, each of parked vehicles 12-15 may passively or actively broadcast candidate vehicle description information. Vehicle 11 may receive the vehicle description information describing parked vehicles 12-15 when vehicle 11 is in the vicinity of parked vehicles 12-15.

In some embodiments, the vehicle description information received via the wireless connections may be verified based on an image stream captured by vehicle 11. For example, vehicle description subsystem 114 may compare the wirelessly-received vehicle description information to information extracted from the image stream captured by vehicle 11. Vehicle description subsystem 114 may compare a color, vehicle type, vehicle identification number (VIN), or license plate number of each respective parked vehicle captured by the image stream to the wirelessly-received vehicle description information. Vehicle description subsystem 114 may verify the received vehicle description information if the received candidate vehicle description information matches vehicle description information derived from the image stream. In some embodiments, vehicle description subsystem 114 may verify the wirelessly-received vehicle description information by analyzing feature vectors derived from the image stream (e.g., as described above).

In some embodiments, space information subsystem 116 determines space information related to locations of the parked vehicles relative to available parking spaces in the parking area. Space information may include the amount of space available between recognized parked vehicles. In some embodiments, the space information may indicate whether or not a parking space is available next to vehicles identified as being parked. Space information subsystem 116 may use feature vectors extracted from the image stream obtained by image stream subsystem 112 to identify space information (e.g., open parking spaces). By way of example, an image stream of a parking area (e.g., parking area 10) may be obtained by image stream subsystem 112. Several vehicles (e.g., parked vehicles 12-15) may be parked in parking area 10. Vehicle description subsystem 114 determines a first parked vehicle (e.g., parked vehicle 12) to be a red Ford Mustang and a second parked vehicle (e.g., parked vehicle 13) to be a blue Nissan Sentra. In some embodiments, space information subsystem 116 determines, using the extracted feature vectors, that there is no obstruction between parked vehicle 12 and parked vehicle 13. In some embodiments, space information subsystem 116 may determine that parked vehicle 12 and parked vehicle 13 are separated by a sufficiently large space, meaning there is an available parking space between parked vehicle 12 and parked vehicle 13. In some embodiments, space information subsystem 116 may repeat these steps for each parking space captured by the image stream or for each parking space in the parking area. Feature vectors and methods in which space information subsystem 116 uses the feature vectors are described in more detail below with respect to one or more particular embodiments.

In some embodiments, image processing techniques used by vehicle description subsystem 114 and space information subsystem 116 may utilize one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free flowing, with connections interacting in a more chaotic and complex fashion.

As an example, a machine learning model may take as inputs image streams and provide as outputs patterns, objects, spaces, or other features of the image streams. In one use case, the outputs may be fed back to the machine learning model as input to train the machine learning model (e.g., alone or in conjunction with user indications of the accuracy of the outputs, labels associated with the inputs, or with other reference feedback information). In another use case, the machine learning model may update its configurations (e.g., weights, biases, or other parameters) based on its assessment of its prediction (e.g., outputs including patterns, objects, spaces, or other features of the image streams) and reference feedback information (e.g., user indication of accuracy, reference labels, or other information). In another use case, where the machine learning model is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model may be trained to generate better predictions.

In some embodiments, mapping subsystem 118 generates a mapping of parking area 10 based on the vehicle description information and the space information. For example, mapping subsystem 118 may receive vehicle description information from vehicle description subsystem 114 and space information from space information subsystem 116. In some embodiments, mapping subsystem 118 may compile the vehicle description information and the space information to generate a mapping of the parking area (e.g., as viewed from above). In some embodiments, the mapping of the parking area indicates (i) the color and vehicle type of each of the parked vehicles (e.g., parked vehicles 12-15) and (ii) the locations of the parked vehicles relative to the available parking spaces. In certain embodiments, mapping subsystem 118 provides the mapping of the parking area to a requesting application. In some embodiments, the requesting application may be another vehicle that has entered the parking area.

In some embodiments, mapping subsystem 118 may update the mapping when new information is received from vehicle description subsystem 114 or space information subsystem 116. For example, computer 102 may continue to monitor an image stream (e.g., via image stream subsystem 112). In some embodiments, vehicle description subsystem 114 may identify a new parked vehicle in the parking area based on the image stream. In another example, space information subsystem 116 may identify a new available space in the parking area based on the image stream. In some embodiments, mapping subsystem 118 may update the mapping based on a space in which vehicle 11 parks. In some embodiments, mapping subsystem 118 may provide a most recently updated mapping to a requesting application.

Figure 2:
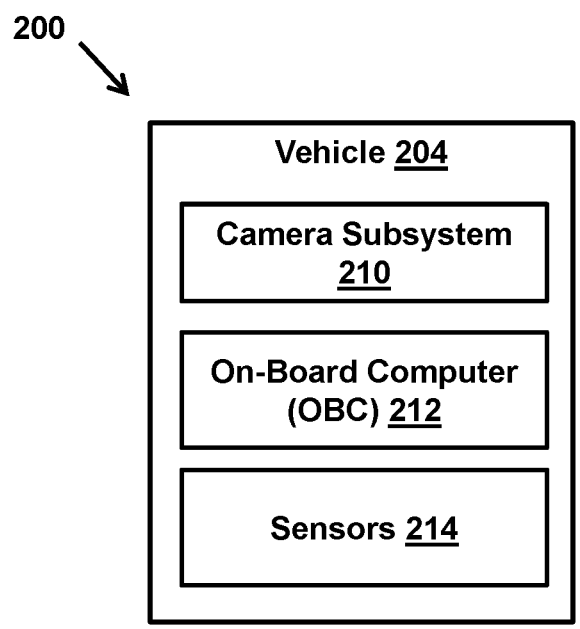
FIG. 2 shows a block diagram of a client device that facilitates generation of a mapping of a parking area, in accordance with one or more embodiments.

FIG. 2 shows a block diagram 200 of a client device that facilitates generation of a mapping of a parking area, in accordance with one or more embodiments. In some embodiments, block diagram 200 may correspond to one or more vehicles shown in FIG. 1A (e.g., vehicle 11). In some embodiments, vehicle 204 may communicate with server 17 via cloud 16, as shown in FIG. 1A. In some embodiments, block diagram 200 may correspond to one or more of client devices 104a-104n, as shown in FIG. 1B. In some embodiments, vehicle 204 may communicate with computer 102 via network 105, as shown in FIG. 1B.

Each vehicle 204 may include at least a camera subsystem 210, an on-board computer (OBC) 212, and one or more sensors 214. Camera subsystem 210 may be coupled with the vehicle 204 and configured to obtain an image stream. In some embodiments, camera subsystem 210 may be configured to continually, or intermittently, capture image data of the area around vehicle 204. The image stream may capture parked vehicles or parking spaces located near the parked vehicles in a parking area. In some embodiments, camera subsystem 210 may be a parking assistance camera (e.g., backup camera), a camera of a device located within vehicle 204, or another camera system. In some embodiments, OBC 212 may perform some or all of the image processing techniques discussed above for processing the image stream. In some embodiments, OBC 212 may send a captured image stream to image stream subsystem 112 for image processing by various components of computer 102. As discussed above, image processing may include identifying vehicle description and space information based on the image stream. In some embodiments, a machine learning model may be applied to recognize features of the image stream, as discussed above.

In some embodiments, vehicle 204 (e.g., using OBC 212) may generate a mapping of the parking area based on obtained vehicle description information and space information. Alternatively, vehicle 204 may receive a mapping from computer 102 (e.g., via network 105). Computer 102 may use mapping subsystem 118 to generate the mapping of the parking area. In certain embodiments, the mapping indicates the color and vehicle type of each of the parked vehicles and the locations of the parked vehicles relative to the available parking spaces.

On-board computer (OBC) 212 may be a diagnostic connector coupled with vehicle 204. In certain embodiments, one or more sensors 214 may be selectively positioned within vehicle 204. In some embodiments, each vehicle 204 may have a single sensor 214. In certain embodiments, each sensor 214 may be coupled with OBC 212.

Sensor 214 may be configured to communicate with sensors of other vehicles (e.g., parked vehicles) via one or more wireless communication protocols. Such protocols include, for example, near-field communication (NFC), Bluetooth®, active radio frequency identification (RFID), passive RFID, and WiFi™. In some embodiments, sensor 214 may be configured to continually, or intermittently, receive signals emitted by nearby sensors. In an operation, sensor 214 may be able to detect candidate vehicle description information indicating the color and vehicle type for each parked vehicle (e.g., from nearby sensors coupled to other vehicles).

Figure 3:
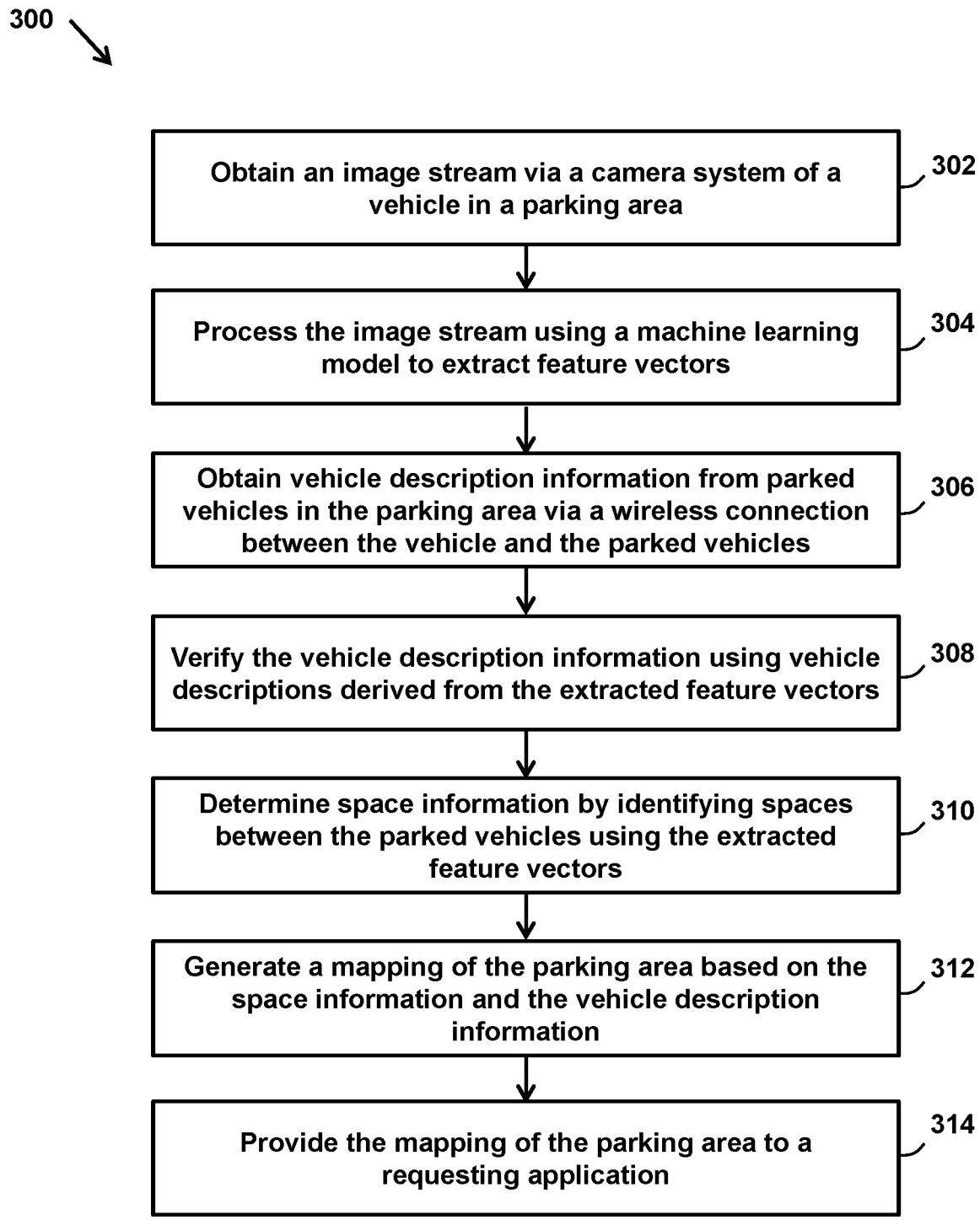
FIG. 3 shows a flowchart of a method of generating a mapping of a parking area using vehicle description information and space information, in accordance with one or more embodiments.

FIG. 3 is a flowchart of processing operations of a method that enables the various features and functionality of the system as described in detail above. The processing operations of the method presented below is intended to be illustrative and non-limiting. In some embodiments, for example, the method may be accomplished with one or more additional operations not described, and/or without one or more of the operations discussed. Additionally, the order in which the processing operations of the method is illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 3 shows a flowchart of a method 300 of generating a mapping of a parking area using vehicle description information and space information, in accordance with one or more embodiments. In an operation 302, a vehicle system obtains an image stream (e.g., by a camera system coupled to the vehicle). In some embodiments, a vehicle may have a camera built into the car (e.g., a backup camera). Operation 302 may be performed by a subsystem that is the same as or similar to image stream subsystem 112, in accordance with one or more embodiments. In an operation 304, the image stream obtained in operation 302 is processed to extract feature vectors. Operation 304 may be performed by a subsystem that is the same as or similar to image stream subsystem 112, in accordance with one or more embodiments.

In an operation 306, candidate vehicle description information is obtained via wireless connections between the system and parked vehicles. The candidate vehicle description information may indicate a color, a vehicle type, and other description information for each of the parked vehicles. Operation 306 may be performed, for example, as the vehicle listens for passive low-energy Bluetooth™ (BLE) signals from other (parked) cars. The passive BLE signals may contain vehicle description information, including color, vehicle type, and other description information. For example, the system may receive information from a parked car that the parked car is a red 2012 For Mustang GT. Operation 306 may be performed by a subsystem that is the same as or similar to vehicle description subsystem 114, in accordance with one or more embodiments.

In an operation 308, the vehicle description information obtained via the wireless connections is verified using vehicle descriptions derived from the feature vectors extracted in operation 304. In this example, the vehicle descriptions obtained using the extracted feature vectors verify the information obtained via the wireless connections, i.e., that the parked car is a red 2012 Ford Mustang GT. This operational step is a confirmation step. Operation 308 may be performed by a subsystem that is the same as or similar to vehicle description subsystem 114, in accordance with one or more embodiments.

In an operation 310, space information related to locations of the parked vehicles relative to available parking spaces in the parking area is determined. In some embodiments, the space information may be determined by identifying spaces between the parked vehicles using the feature vectors extracted in operation 304. Operation 310 may be performed by a subsystem that is the same as or similar to space information subsystem 116, in accordance with one or more embodiments. In an operation 312, a mapping of the parking area may be generated based on the space information (determined in operation 310) and the vehicle description information (verified in operation 308). Operation 312 may be performed by a subsystem that is the same as or similar to mapping subsystem 118, in accordance with one or more embodiments. Finally, in an operation 314, the mapping of the parking area is provided to a requesting application. A driver may use the application to navigate to an open parking space. Operation 314 may be performed by a subsystem that is the same as or similar to mapping subsystem 118, in accordance with one or more embodiments.

Figure 4:
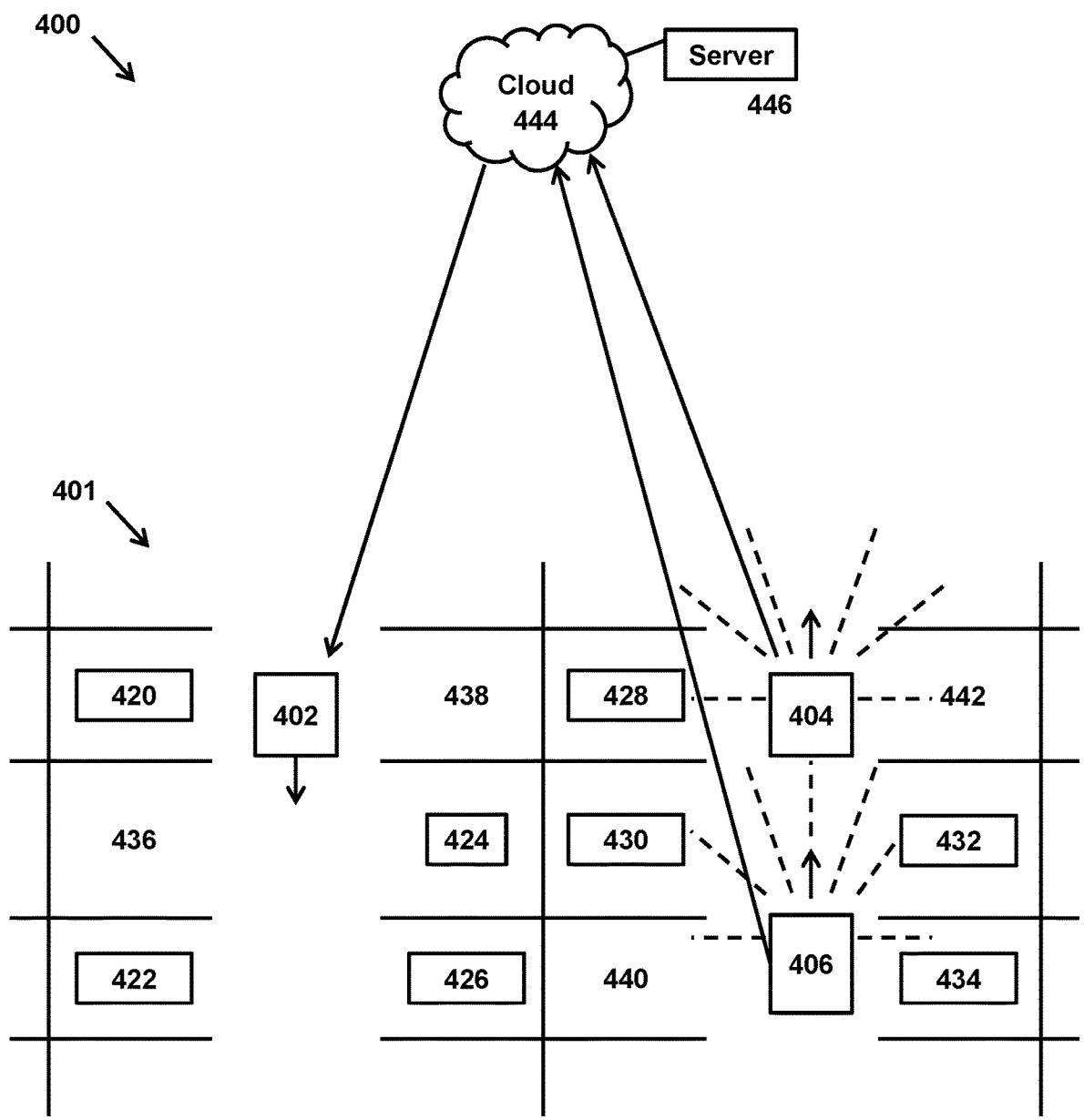
FIG. 4 shows a system for generating a supplemental mapping of a parking area, in accordance with one or more embodiments.

In some embodiments, a vehicle (e.g., vehicle 11, as shown in FIG. 1A, or vehicle 204, as shown in FIG. 2) may obtain a supplemental mapping of the parking area. FIG. 4 shows a system 400 for generating a supplemental mapping of a parking area, in accordance with one or more embodiments. The supplemental mapping may be based on one or more image streams obtained via other vehicles and may indicate locations of available parking spaces relative to parked vehicles. Vehicle 402 may drive through a parking area 401. Vehicles 404 and 406 may also be driving through parking area 401. In some embodiments, vehicles 404 and 406 may perform steps described above in relation to FIG. 3 (e.g., method 300). That is, vehicles 404 and 406 may each obtain an image stream through camera systems on each vehicle (e.g., camera subsystem 210, as shown in FIG. 2). Vehicle 404 and vehicle 406 may each determine, based on the image stream, vehicle description information related to parked vehicles 420-434. Vehicles 404 and 406 may also determine, based on the image stream, space information related to available parking spaces 436-442. In some embodiments, vehicle 404 and vehicle 406 may determine the vehicle description information and the space information using OBC 212, as shown in FIG. 2, or using various components of computer 102, as shown in FIG. 1B, as described above. Based on the vehicle description information and the space information, vehicles 404 and 406 may each generate a supplemental mapping of the parking area. In some embodiments, vehicle 404 and vehicle 406 may each generate the supplemental mapping using OBC 212, as shown in FIG. 2, or using various components of computer 102, as shown in FIG. 1B, as described above. The supplemental mapping may indicate relative locations of the parked vehicles 420-434 and the available parking spaces 436-442. The generated supplemental mappings may then be provided via cloud 444 to vehicle 402.

In some embodiments, vehicle 402 may use the supplemental mappings (e.g., generated by vehicles 404 and 406) to supplement a mapping generated by vehicle 402. For example, vehicle 402 may drive through a portion of parking area 401 and may use the supplemental mappings for portions of parking area 401 through which vehicle 402 does not drive. In some embodiments, vehicle 402 may not generate a mapping and may solely use a compilation of the supplemental mappings generated by vehicles 404 and 406. In some embodiments, vehicle 402 may use the supplemental mappings to update a mapping generated by vehicle 402. For example, the supplemental mappings may comprise more recent information (e.g., regarding parked vehicles and available parking spaces) than the mapping generated by vehicle 402. In this example, vehicle 402 may update (e.g., using mapping subsystem 118, as shown in FIG. 1B) the mapping based on the most up-to-date information available from the mapping and the supplemental mappings.

In some embodiments, vehicle 402 is caused to generate navigation information for parking vehicle 402 at an available parking space (e.g., available parking space 440). In some embodiments, the navigation information may be based on a mapping generated by vehicle 402 and the supplemental mappings of the parking area. The navigation information may be presented on a user interface of vehicle 402 (e.g., using OBC 212, as shown in FIG. 2). For example, the navigation may be presented similarly to a GPS system. The navigation may present navigation information for a driver of vehicle 402 to follow directions to the available parking space (e.g., available parking space 440).

Figure 5:
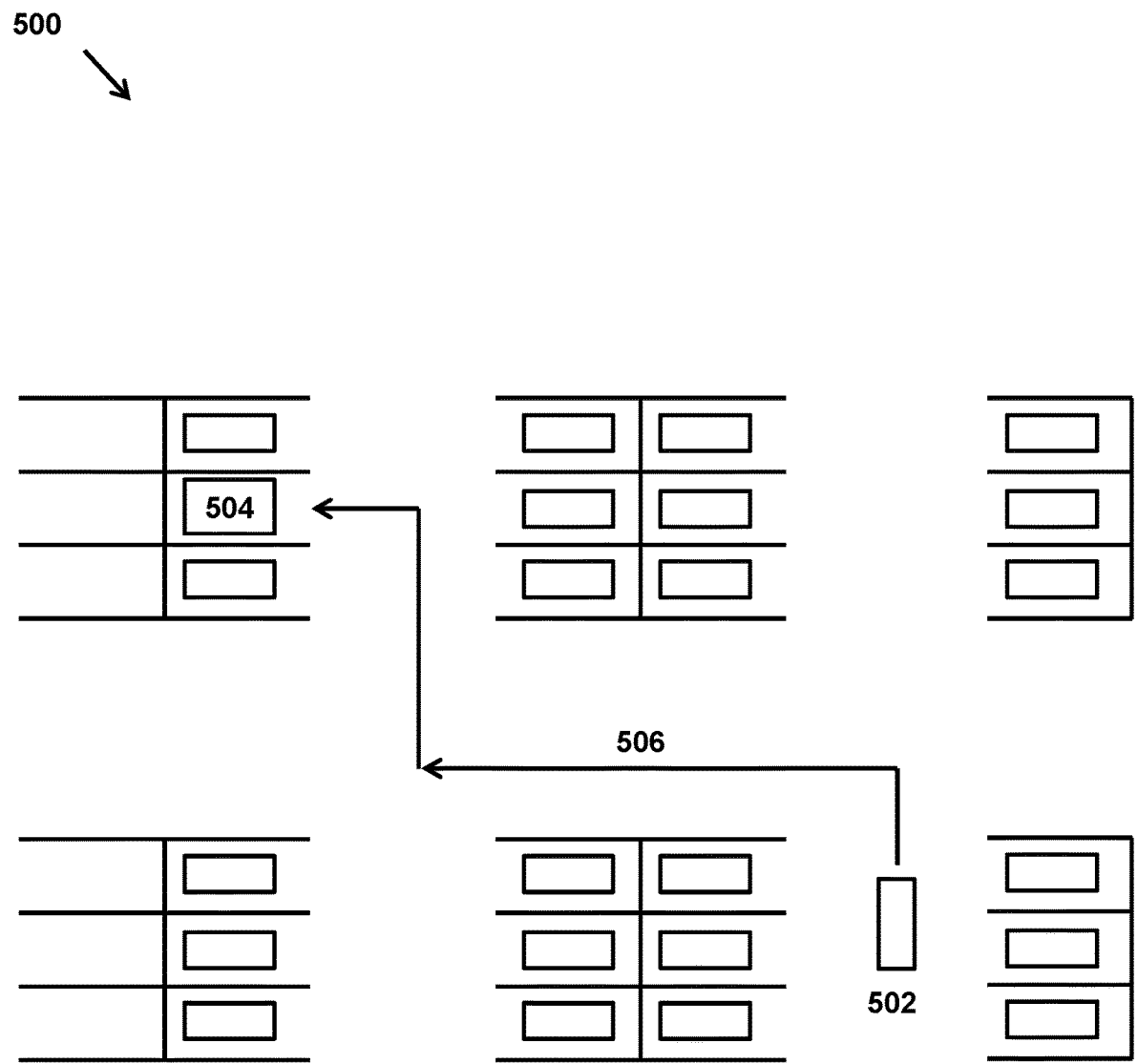
FIG. 5 shows a mapping of a parking area, in accordance with one or more embodiments.

FIG. 5 shows a mapping 500 of a parking area (e.g., generated by mapping subsystem 118, as shown in FIG. 1B), in accordance with one or more embodiments. Mapping 500 may depict available parking spaces (e.g., available parking space 504) and parked vehicles. In some embodiments, mapping 500 may be generated using data transmitted from vehicles using the systems described above (e.g., system 100 or system 400). For example, mapping 500 may be a compilation (e.g., generated by mapping subsystem 118, as shown in FIG. 1B) of various mappings and supplemental mappings generated by various vehicles. In some embodiments, mapping 500 may be downloaded by a vehicle (e.g., vehicle 502) entering the parking area. In some embodiments, mapping 500 may provide a driver of vehicle 502 with navigation information (e.g., parking guidance 506) for navigating to available parking space 504. Parking guidance 506 may be presented on a user interface of vehicle 502 (e.g., using OBC 212, as shown in FIG. 2). For example, parking guidance 506 may be presented similarly to a GPS system.

Returning to FIG. 1B, the various computers and subsystems illustrated in FIG. 1B may include one or more computing devices that are programmed to perform the functions described herein. The computing devices may include one or more electronic storages, one or more physical processors programmed with one or more computer program instructions, and/or other components. The computing devices may include communication lines or ports to enable the exchange of information within a network (e.g., network 105) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of computer 102 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any subsystems described may provide more or less functionality than is described.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining an image stream via a vehicle; determining, based on the image stream, vehicle description information related to another vehicle in a parking area; determining, based on the image stream, space information related to any available parking spaces in the parking area; and generating a mapping of the parking area based on the vehicle description information and the space information.
2. The method of embodiment 1, wherein the mapping of the parking area indicates relative locations of the one or more other vehicles and the one or more available parking spaces.
3. The method of any of embodiments 1-2, wherein the vehicle description information indicates a color of at least one vehicle of the one or more other vehicles, a vehicle type of the at least one vehicle, a vehicle identification number of the at least one vehicle, or a license plate number of the at least one vehicle.
4. The method of any of embodiments 1-3, further comprising: obtaining candidate vehicle description information via wireless connections between the vehicle and other vehicles; and wherein determining the vehicle description information comprises verifying the vehicle description information based on the image stream.
5. The method of embodiment 4, wherein the candidate vehicle description information indicates a color of at least one vehicle of the one or more other vehicles, a vehicle type of the at least one vehicle, a vehicle identification number of the at least one vehicle, or a license plate number of the at least one vehicle.
6. The method of any of embodiments 1-5, further comprising: obtaining, via a network, a supplemental mapping of the parking area; generating navigation information for parking the vehicle at the available parking space; and presenting parking guidance to the user on a user interface of the vehicle.
7. The method of embodiment 6, wherein the supplemental mapping of the parking area is (i) based on image streams obtained via at least one other vehicle, and (ii) indicates a location of an available parking space relative to a parked vehicle.
8. The method of any of embodiments 1-7, wherein an available parking space is highlighted based on the mapping of the parking area, shown on a user interface of the vehicle.
9. The method of any of embodiments 1-8, wherein the vehicle description information indicates the color of the parked vehicle in the parking area.
10. The method of any of embodiments 1-9, wherein the vehicle description information indicates the vehicle type of the parked vehicle in the parking area.
11. The method of any of embodiments 1-10, wherein the vehicle description information indicates the vehicle identification number of the parked vehicle in the parking area.
12. The method of any of embodiments 1-11, wherein the vehicle description information indicates the license plate number of the at least one vehicle in the parking area.
13. A tangible, non-transitory, machine-readable medium storing instructions that, when executed by the processors, cause the processors to effectuate operations comprising those of any of embodiments 1-12.
14. A system comprising: one or more processors; and memory storing instructions that, when executed by the processors, cause the processors to effectuate operations comprising those of any of embodiments 1-12.

What is claimed is:

1. A system for facilitating a vehicle-generated mapping of a parking area via video stream processing and passive-scanning-obtained wireless signals from parked vehicles in the parking area, the system comprising:
   a vehicle comprising one or more processors programmed with computer program instructions that, when executed, cause the vehicle to:
   perform, while the vehicle is driving, passive short-range wireless scanning to obtain passive wireless signals from parked vehicles in the parking area, the passive wireless signals indicating a vehicle attribute for each of the parked vehicles;
   process a video stream obtained via a camera system of the vehicle in a parking area to extract feature vectors from the video stream;

determine, based on the passive wireless signals and the feature vectors from the video stream, vehicle description information related to the parked vehicles in the parking area, wherein the vehicle description information indicates a color and vehicle type for each of the parked vehicles;

determine, based on the feature vectors from the video stream, space information related to locations of the parked vehicles relative to available parking spaces in the parking area;

generate a mapping of the parking area based on the vehicle description information and the space information, wherein the mapping of the parking area indicates (i) the color and vehicle type of each of the parked vehicles and (ii) the locations of the parked vehicles relative to the available parking spaces; and provide the mapping of the parking area to a requesting application, the requesting application requesting the mapping for another vehicle entering or in the parking area, wherein at least one available parking space is indicated on a vehicle user interface based on the mapping of the parking area.

2. The system of claim 1, wherein determining the vehicle description information comprises:

predicting, based on the feature vectors, the color or vehicle type for each of the parked vehicles; and verifying, based on the predicted colors or vehicle types, the vehicle attributes indicated by the passive wireless signals, each of the vehicle attributes comprising at least one color or vehicle type.

3. The system of claim 1, wherein the vehicle is caused to:

obtain, via a network, a supplemental mapping of the parking area, the supplemental mapping of the parking area (i) being based on one or more image streams obtained via at least one other vehicle and (ii) indicating a location of an available parking space relative to a parked vehicle;

generate, based on the supplemental mapping of the parking area, navigation information for parking the vehicle at the available parking space; and cause, based the navigation information, parking guidance to be presented on a user interface of the vehicle.

4. A method comprising:

obtaining, by one or more processors, an image stream via a vehicle in a parking area comprising one or more other vehicles parked in the parking area, each other vehicle of the one or more other vehicles being configured to emit passive wireless signals indicating a vehicle attribute of the other vehicle;

determining, by one or more processors, based on the passive wireless signals and the image stream, vehicle description information related to the one or more other vehicles in the parking area, wherein the vehicle description information indicates a color of at least one vehicle of the one or more other vehicles, a vehicle type of the at least one vehicle, a vehicle identification number of the at least one vehicle, or a license plate number of the at least one vehicle;

determining, by one or more processors, based on the image stream, space information related to one or more available parking spaces in the parking area;

generating, by one or more processors, a mapping of the parking area based on the vehicle description information and the space information, wherein the mapping of the parking area indicates relative locations of the one or more other vehicles and the one or more available parking spaces; and providing the mapping of the parking area to a requesting application, wherein at least one available parking space is indicated on a vehicle user interface based on the mapping of the parking area.

5. The method of claim 4, further comprising:

obtaining, by one or more processors, candidate vehicle description information via one or more wireless connections between the vehicle and the one or more other vehicles, wherein the candidate vehicle description information indicates the color of the at least one vehicle, the vehicle type of the at least one vehicle, the vehicle identification number of the at least one vehicle, or the license plate number of the at least one vehicle;

wherein determining the vehicle description information comprises verifying, based on the image stream, the color of the at least one vehicle, the vehicle type of the at least one vehicle, the vehicle identification number of the at least one vehicle, or the license plate number of the at least one vehicle indicated by the candidate vehicle description information.

6. The method of claim 4, further comprising:

obtaining, by one or more processors, via a network, a supplemental mapping of the parking area, the supplemental mapping of the parking area (i) being based on one or more image streams obtained via at least one other vehicle and (ii) indicating a location of an available parking space relative to a parked vehicle;

generating, based on the supplemental mapping of the parking area, navigation information for parking the vehicle at the available parking space; and causing, based the navigation information, parking guidance to be presented on a user interface of the vehicle.

7. The method of claim 4, further comprising:

causing, by one or more processors, based on the mapping of the parking area, highlighting of at least one available parking space on a user interface of the vehicle.

8. The method of claim 4, wherein the mapping of the parking area indicates (i) the color of the at least one vehicle, (ii) the vehicle type of the at least one vehicle, and (iii) the relative location of the at least one vehicle and the one or more available parking spaces.

9. The method of claim 4, wherein the vehicle description information and the passive wireless signals indicate the color of the at least one vehicle in the parking area.

10. The method of claim 4, wherein the vehicle description information and the passive wireless signals indicate the vehicle type of the at least one vehicle in the parking area.

11. The method of claim 4, wherein the vehicle description information and the passive wireless signals indicate the vehicle identification number or the license plate number of the at least one vehicle in the parking area.

12. The method of claim 4, further comprising:

performing, while the vehicle is driving, passive short-range wireless scanning to obtain the passive wireless signals from the one or more other vehicles in the parking area.

13. A non-transitory computer-readable medium comprising instructions that, when executed by one or more processors, cause operations comprising:

obtaining an image stream via a vehicle in a parking area comprising one or more other vehicles, each other vehicle of the one or more other vehicles being configured to emit passive wireless signals indicating a vehicle attribute of the other vehicle;

determining based on the passive wireless signals and the image stream, vehicle description information related to the one or more other vehicles in the parking area, wherein the vehicle description information indicates a color of at least one vehicle of the one or more other vehicles, a vehicle type of the at least one vehicle, a vehicle identification number of the at least one vehicle, or a license plate number of the at least one vehicle;

determining based on the image stream, space information related to one or more available parking spaces in the parking area;

generating a mapping of the parking area based on the vehicle description information and the space information, wherein the mapping of the parking area indicates relative locations of the one or more other vehicles and the one or more available parking spaces; and providing the mapping of the parking area to a requesting application, wherein at least one available parking space is indicated on a vehicle user interface based on the mapping of the parking area.

14. The non-transitory computer-readable medium of claim 13, the operations further comprising:

obtaining via a network, a supplemental mapping of the parking area, the supplemental mapping of the parking area (i) being based on one or more image streams obtained via at least one other vehicle and (ii) indicating a location of an available parking space relative to a parked vehicle;

generating, based on the supplemental mapping of the parking area, navigation information for parking the vehicle at the available parking space; and causing, based the navigation information, parking guidance to be presented on a user interface of the vehicle.

15. The non-transitory computer-readable medium of claim 13, the operations further comprising:

causing based on the mapping of the parking area, highlighting of at least one available parking space on a user interface of the vehicle.

16. The non-transitory computer-readable medium of claim 13, wherein the mapping of the parking area indicates (i) the color of the at least one vehicle, (ii) the vehicle type of the at least one vehicle, and (iii) the relative location of the at least one vehicle and the one or more available parking spaces.

17. The non-transitory computer-readable medium of claim 13, wherein the vehicle description information and the passive wireless signals indicate the color of the at least one vehicle in the parking area.

18. The non-transitory computer-readable medium of claim 13, wherein the vehicle description information and the passive wireless signals indicate the vehicle type of the at least one vehicle in the parking area.

19. The non-transitory computer-readable medium of claim 13, wherein the vehicle description information and the passive wireless signals indicate the vehicle identification number or the license plate number of the at least one vehicle in the parking area.

20. The non-transitory computer-readable medium of claim 13, the operations further comprising:

performing, while the vehicle is driving, passive short-range wireless scanning to obtain the passive wireless signals from the one or more other vehicles in the parking area.

* * * * *